(12) United States Patent
Yazawa et al.

(10) Patent No.: US 7,215,512 B2
(45) Date of Patent: May 8, 2007

(54) THIN-FILM MAGNETIC HEAD, MAGNETIC DEVICE INCLUDING THE SAME, AND METHOD FOR MANUFACTURING THE SAME

(75) Inventors: Hisayuki Yazawa, Niigata-ken (JP); Toshinori Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 394 days.

(21) Appl. No.: 10/912,651

(22) Filed: Aug. 5, 2004

(65) Prior Publication Data
US 2005/0036237 A1 Feb. 17, 2005

(30) Foreign Application Priority Data
Aug. 13, 2003 (JP) .............................. 2003-292842

(51) Int. Cl.
*G11B 5/31* (2006.01)
(52) U.S. Cl. ..................................................... 360/126
(58) Field of Classification Search ................ 360/126, 360/119
See application file for complete search history.

(56) References Cited

U.S. PATENT DOCUMENTS

| | | | |
|---|---|---|---|
| 4,970,615 A * | 11/1990 | Gau ........................... 360/122 |
| 4,970,616 A * | 11/1990 | Ramaswamy ............... 360/122 |
| 5,751,526 A * | 5/1998 | Schemmel ................... 360/317 |
| 5,916,423 A * | 6/1999 | Westwood ............. 204/192.32 |
| 6,055,138 A | 4/2000 | Shi |
| 6,477,002 B1 * | 11/2002 | Mizoh ......................... 360/119 |
| 6,480,355 B1 * | 11/2002 | Kamijima ................... 360/126 |
| 6,683,748 B2 * | 1/2004 | Kim et al. ................... 360/125 |
| 7,002,777 B2 * | 2/2006 | Ogawa et al. .............. 360/126 |

FOREIGN PATENT DOCUMENTS

| | | |
|---|---|---|
| JP | 2002-92818 | 3/2002 |
| JP | 2002-197616 | 7/2002 |

* cited by examiner

*Primary Examiner*—Angel Castro
(74) *Attorney, Agent, or Firm*—Brinks Hofer Gilson & Lione

(57) ABSTRACT

A thin-film magnetic head includes a magnetic pole, a magnetic circuit unit separate from the magnetic pole, and a coil layer. The magnetic pole has a predetermined shape in which the width of the bottom surface of an upper magnetic pole layer is larger than the width of the top surface of a lower magnetic pole layer. The core layer is disposed at the back in the height direction of the magnetic pole.

6 Claims, 14 Drawing Sheets

THIN-FILM MAGNETIC HEAD, MAGNETIC DEVICE INCLUDING THE SAME, AND METHOD FOR MANUFACTURING THE SAME

This application claims the benefit of priority to Japanese Patent Application No. 2003-292842, herein incorporated by reference.

BACKGROUND OF THE INVENTION

1. Field of the Invention

The present invention relates to thin-film magnetic heads for applying a magnetic filed to a magnetic recording medium for writing, and particularly to a thin-film magnetic head including a magnetic pole which is easily prepared in such an appropriate shape as to prevent the occurrence of side fringing, and having enhanced characteristics. The present invention also relates to a magnetic device including the thin-film magnetic head and a method for manufacturing the magnetic head.

2. Description of the Related Art

FIG. 15 is a fragmentary enlarged front view of an upper magnetic pole layer, a gap layer, and lower magnetic pole layer shown in FIG. 1 of Japanese Unexamined Patent Application Publication No. 2002-197616.

The side surfaces of the upper magnetic pole layer and lower magnetic pole layer slant so that the widths in the track width direction of the magnetic pole layers increase in the directions away from the gap layer, as shown in FIG. 15.

In FIG. 15, the widths in the track width direction of the bottom surface of the upper magnetic pole layer and the top surface of the lower magnetic pole layer are both defined as Tw5.

The shape of the magnetic pole shown in FIG. 15, however, has problems below. FIG. 16 is a schematic illustration for pointing out a problem when the thin-film magnetic head of the above-mentioned patent document moves over a recording medium in practice.

The diagonally shaded area in FIG. 16 shows a region (track) of a recording medium where recording has been made or will be made from the magnetic pole. As shown in FIG. 16, the magnetic pole moves over the recording medium in a slanting position with a predetermined angle θ5. This predetermined angle θ5 is referred to as skew angle.

When the bottom surface of the upper magnetic pole layer and the top surface of the lower magnetic pole layer have the same width of Tw5, as shown in FIG. 15, the skew angle θ5, as shown in FIG. 16, allows an edge of the top surface of the lower magnetic pole to run off the recording region. Consequently, the edge erases the recording magnetic field in the adjacent region where recording has already been made, or rewrites, and thus side fringing occurs seriously.

In Japanese Unexamined Patent Application Publication No. 2002-92818 and U.S. Pat. No. 6,055,138, the width Tw6 in the track width direction of the top surface of the lower core layer is smaller than the width Tw7 in the track width direction of the bottom surface of the upper core layer, as shown in FIG. 17. This structure of the thin-film magnetic head is expected to prevent the occurrence of side fringing.

It is not, however, clear whether this structure actually prevent side fringing effectively.

Specifically, the side fringing cannot be prevented by only controlling the structure of the thin-film magnetic head, and the relationship with the skew angle is an important factor. However, the two patent documents describe only the structure of the thin-film magnetic head, but not the relationship with the skew angle. For example, while the above-mentioned Japanese Unexamined Patent Application Publication No. 2002-92818 states a problem of the known art at a skew angle of 0°, with reference to FIG. 12 of the document, it does not state whether the structure shown in FIG. 11 of the same document having a skew angle prevents the side fringing effectively.

In the above-mentioned two patent documents, the lower core layer and the upper core layer oppose each other with a gap layer therebetween, at the opposing face to the recording medium. Thus, the structure is not such that magnetic pole layers separate from the core layers oppose each other with a gap layer therebetween.

Accordingly, the lower core layer and the upper core layer extend long in the height direction from the recording medium-opposing face, and are magnetically coupled at the back in the height direction to define a magnetic circuit.

Since the lower core layer and the upper core layer do not require only to be provided in the vicinity of the medium-opposing face, it is very difficult to reduce the track width with high precision so as to realize high recording density. Thus, this structure is liable to degrade recording properties.

In addition, since the lower core layer extends long in the height direction from the medium-opposing face, a coil layer has no choice but to be provided above the lower core layer. Thus, it is limited where the coil layer is provided. It is important that the region where the coil layer is formed can be selected from a wide range of areas, from the viewpoint of achieving a miniaturized thin-film magnetic head.

Furthermore, the above-mentioned two patent documents do not specifically describe how the structure is formed in which the top surface of the lower core layer has a smaller width Tw6 than the width Tw7 of the bottom surface of the upper core layer. Although the Japanese Unexamined Patent Application Publication No. 2002-92818 proposes a manufacturing method shown in FIGS. 5 to 10, these figures illustrate a method for manufacturing a thin-film magnetic head in which the width Tw6 of the top surface of the lower core layer and the width Tw7 of the bottom surface of the upper core layer are the same.

SUMMARY OF THE INVENTION

Accordingly, in order to overcome the above-described problems, an object of the present invention is to provide a thin-film magnetic head including a magnetic pole which is easily prepared in such an appropriate shape as to prevent the occurrence of side fringing, and having enhanced characteristics, and to provide a magnetic device including the thin-film magnetic head and a method for manufacturing the magnetic head.

According to an aspect of the present invention, a thin-film magnetic head is provided which includes: a magnetic pole disposed in a predetermined region lying in the height direction from a face opposing a recording medium; a magnetic circuit unit for conducting a recording magnetic field to the magnetic pole; and a coil layer for inducing the recording magnetic field, disposed at the back in the height direction of the magnetic pole. The magnetic pole includes a lower magnetic pole layer, an upper magnetic pole layer, and a gap layer lying between the lower magnetic pole layer and the upper magnetic pole layer. The width Tw1 in the track width direction of the bottom surface of the upper magnetic pole layer is larger than the width Tw2 in the track width direction of the top surface of the lower magnetic pole layer, and the width in the track width direction of the gap layer gradually increases from the side edges in the track width direction of the top surface of the lower magnetic pole layer to the side edges in the track width direction of the bottom surface of the upper magnetic pole layer.

By setting the width Tw1 of the bottom surface of the upper magnetic pole layer to be larger than the width Tw2 of the top surface of the lower magnetic pole layer, side fringing can be prevented.

In addition, since the magnetic pole is separate from the magnetic circuit unit, the track width of the magnetic pole can be appropriately reduced.

Furthermore, since the coil layer is disposed in a wide area at the back of the magnetic pole separate from the magnetic circuit unit, the coil layer can have a predetermined size even in a miniaturized thin-film magnetic head.

Preferably, the width Tw3 of the upper surface of the upper magnetic pole layer is larger than the width Tw1. Preferably, the width Tw4 of the bottom surface of the lower magnetic pole layer is larger than the width Tw2. Thus, overwrite (OW) characteristics can be enhanced.

More preferably, the width Tw3 is larger than the width Tw4.

Preferably, the gap layer comprises NiPRe or Au. In order to set the width Tw1 of the bottom surface of the upper magnetic pole layer to be larger than the width Tw2 of the top surface of the lower magnetic pole layer, it is important to select an appropriate material for the gap layer.

According to another aspect of the present invention, a magnetic device including a recording medium and the above-described thin-film magnetic head is provided. The thin-film magnetic head moves over the recording medium at a skew angle θ satisfying the relationship $\tan\theta \leq [(Tw1-Tw2)/2]/(\text{gap layer thickness GL})$.

By setting the skew angle θ so as to satisfy this relationship, side fringing can be prevented effectively.

According to another aspect of the present invention, a method is provided for manufacturing a thin-film magnetic head including a magnetic pole disposed on a recording medium-opposing face side, a magnetic circuit unit for conducting a recording magnetic field to the magnetic pole, and a coil layer for inducing the recording magnetic field. The method includes the steps of: forming a lower magnetic pole layer, a gap layer, and an upper magnetic pole layer in that order from below by plating; and cutting off the sides in the track width direction of the lower magnetic pole layer, the gap layer, and the upper magnetic pole layer, whereby the width Tw1 in the track width direction of the bottom surface of the upper magnetic pole layer becomes larger than the width Tw2 in the track width direction of the top surface of the lower magnetic pole layer.

By applying the method above, the width Tw1 of the bottom surface of the upper magnetic pole layer can be set larger than the width Tw2 of the top surface of the lower magnetic pole layer. The form of the present invention is different from that disclosed in Japanese Unexamined Patent Application Publication No. 2002-92818 and U.S. Pat. No. 6,055,138, which discuss a core layer. Only the magnetic pole can allow a shape in which the width Tw1 of the bottom surface of an upper layer is larger than the width Tw2 of the top surface of a lower layer, through the method of the present invention.

Preferably, the gap layer is formed of a material having a milling rate higher than that of the material of the lower magnetic pole layer and the upper magnetic pole layer. By using such a material, the width Tw1 of the bottom surface of the upper magnetic pole layer can be set larger than the width Tw2 of the top surface of the lower magnetic pole layer.

Preferably, the gap layer is formed of NiPRe or Au. These materials have a milling rate higher than that of the material of the lower magnetic pole layer and the upper magnetic pole layer, such as NiFe alloys.

Preferably, the thickness of the gap layer 3 is in the range of 0.06 to 0.18 μm.

Preferably, the sides of the lower magnetic pole layer and the upper magnetic pole layer are cut off at an angle in the range of 50° to 70° with respect to the direction of the height of the magnetic pole, and more preferably in the range of 55° to 60°. By setting the angle as above, the width Tw1 of the bottom surface of the upper magnetic pole layer can be set larger than the width Tw2 of the top surface of the lower magnetic pole layer more effectively.

The resulting thin-film magnetic head has a shape in which the width Tw1 of the bottom surface of the upper magnetic pole layer is larger than the width Tw2 of the top surface of the lower magnetic pole layer, consequently preventing side fringing.

In addition, since the magnetic pole is separate from the magnetic circuit unit, the track width of the magnetic pole can be appropriately reduced.

Furthermore, since the coil layer is disposed in a wide area at the back of the magnetic pole separate from the magnetic circuit unit, the coil layer can have a predetermined size even in a miniaturized thin-film magnetic head.

In the magnetic device of the present invention, the magnetic head moves over the recording medium at a skew angle θ satisfying the relationship $\tan\theta \leq [(Tw1-Tw2)/2]/(\text{gap layer thickness GL})$. Thus, side fringing can be prevented effectively.

The method for the thin-film magnetic head of the present invention easily and appropriately allows the upper magnetic pole layer to have a bottom surface with a larger width Tw1 than the width Tw2 of the top surface of the lower magnetic pole layer.

In particular, by appropriately selecting or setting the material of the gap layer, ion irradiation angle for ion milling, and the thickness of the gap layer, the formation of the shape in which the width Tw1 of the bottom surface of the upper magnetic pole layer is larger than the width Tw2 of the top surface of the lower magnetic pole layer.

DESCRIPTION OF THE PREFERRED EMBODIMENTS

Figure 1A:
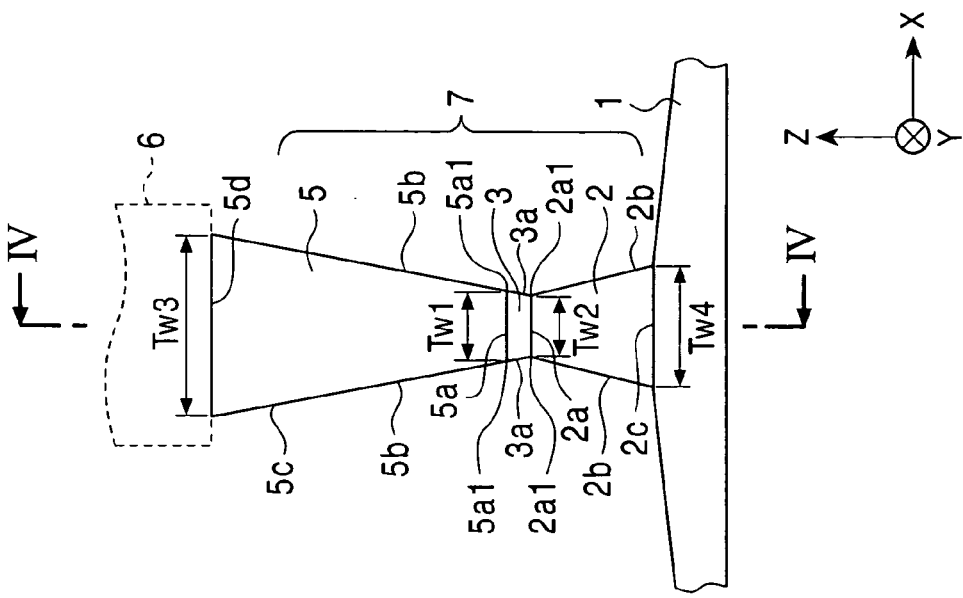
FIGS. 1A and 1B are each a front view of a magnetic head according to an embodiment of the present invention.
Figure 1B:
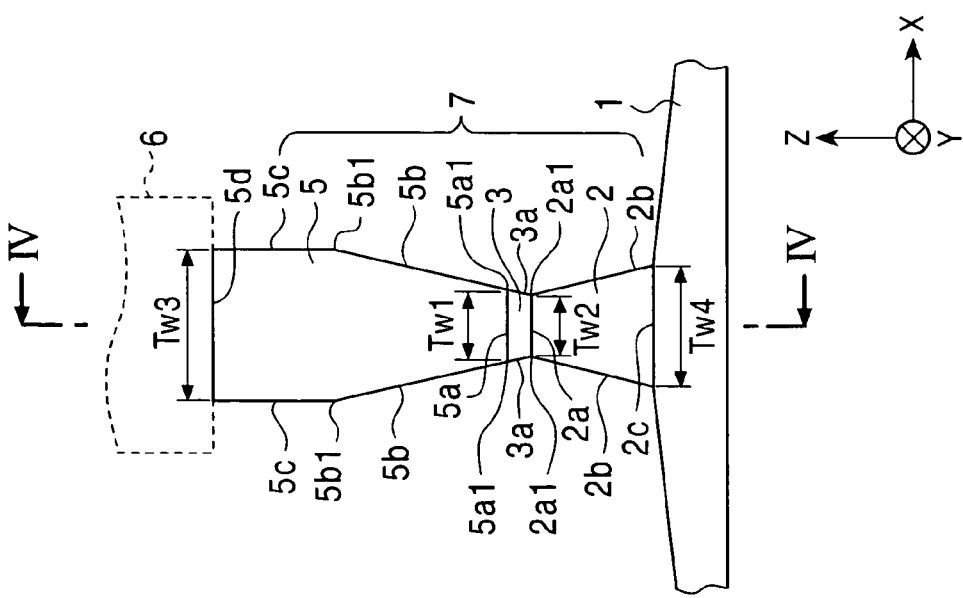
Figure 2:
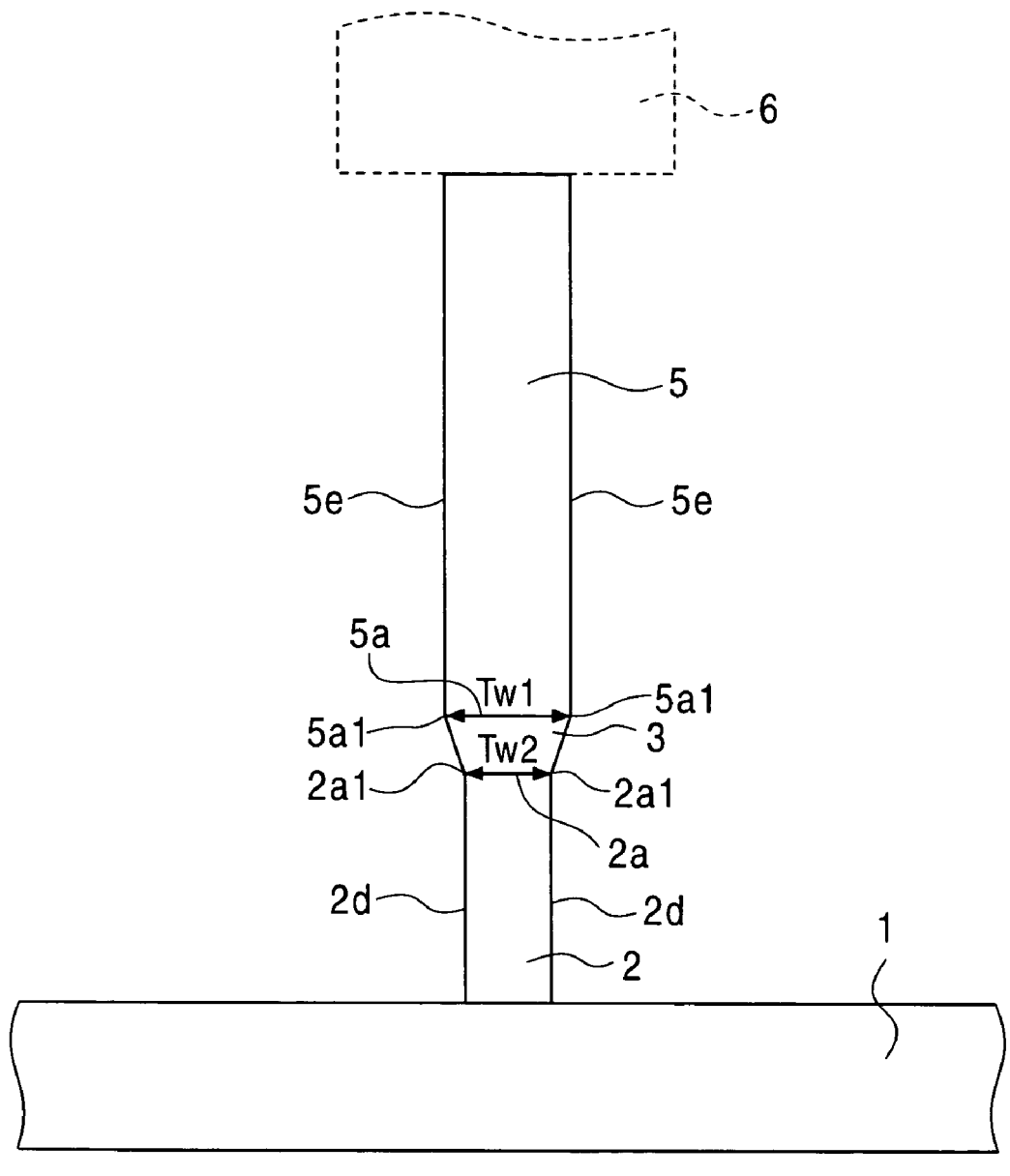
FIG. 2 is a front view of a magnetic head according to another embodiment of the present invention.
Figure 2:
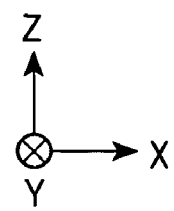
Figure 3:
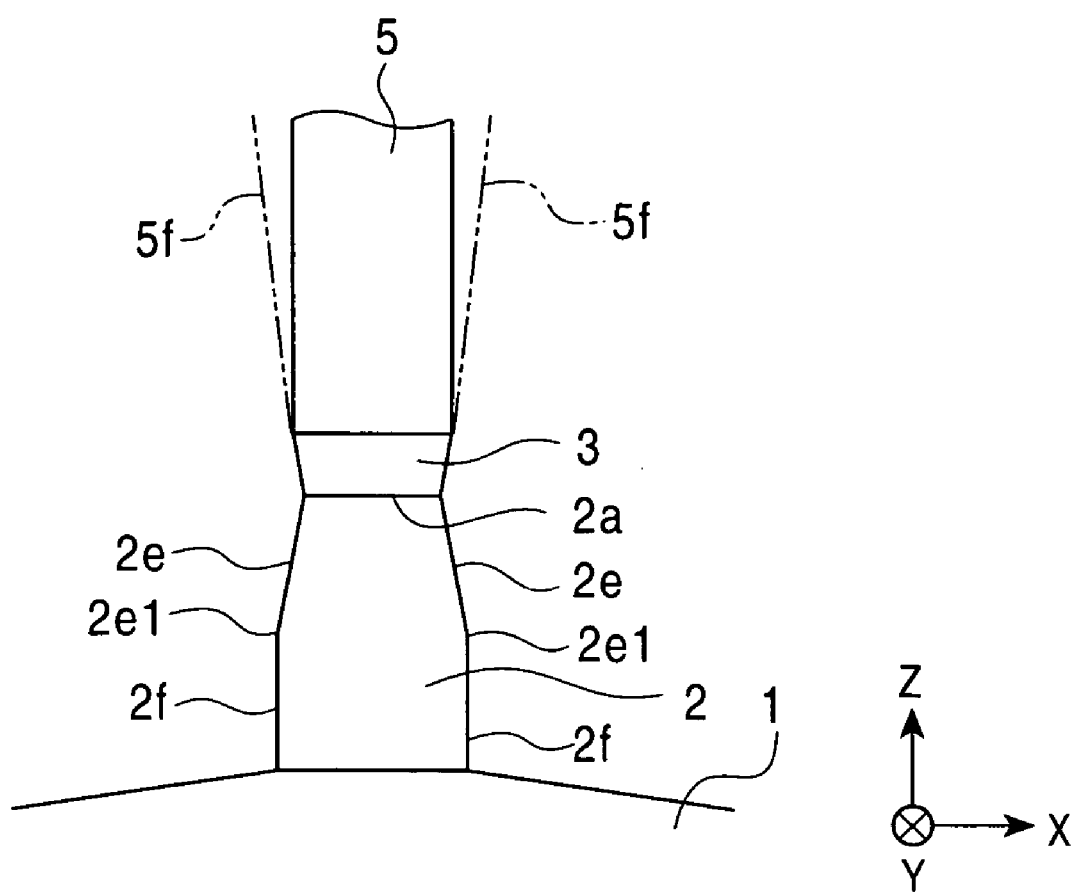
FIG. 3 is a front view of a magnetic head according to still another embodiment of the present invention.
Figure 4:
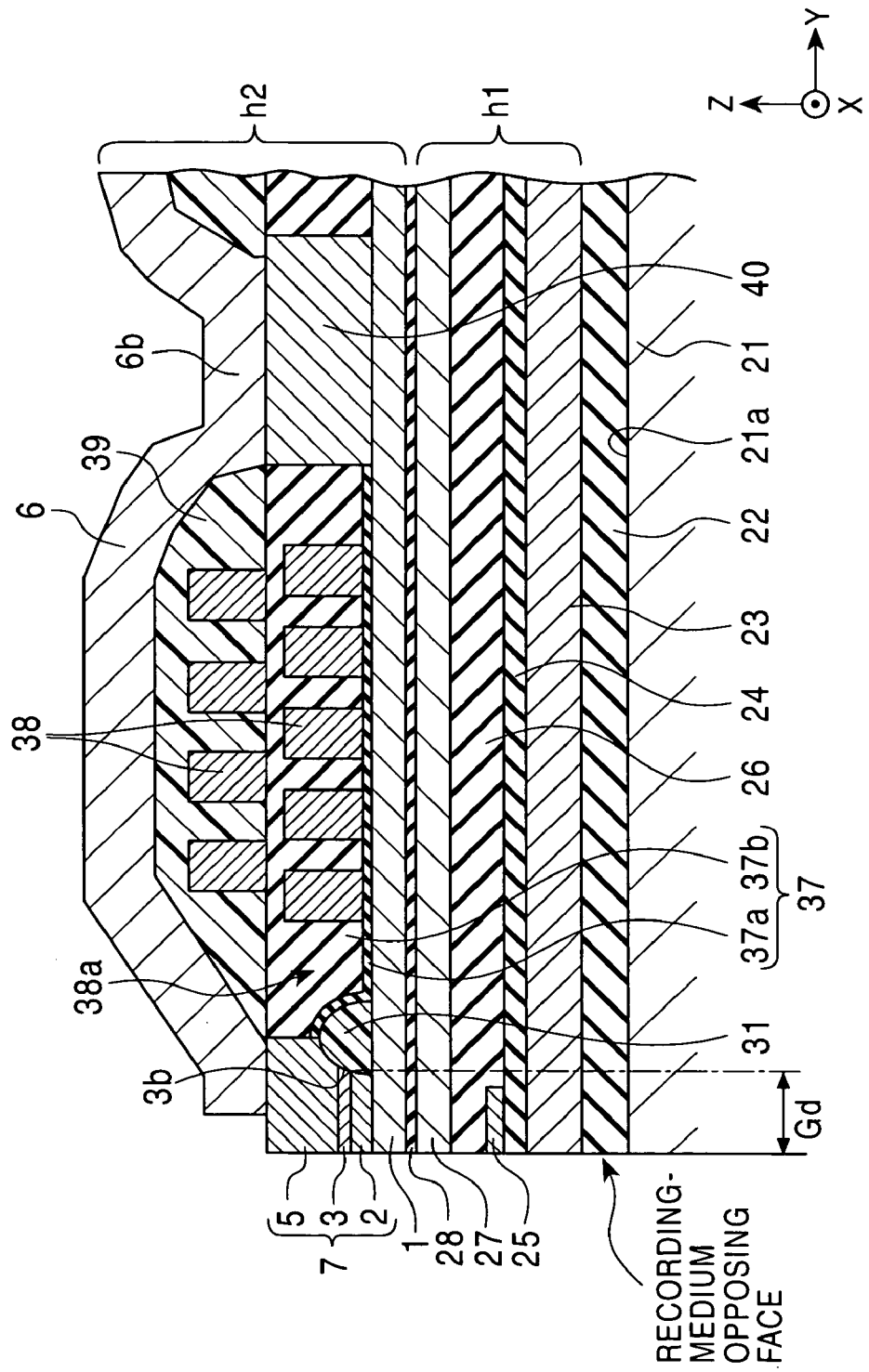
FIG. 4 is a longitudinal sectional view of the magnetic head shown in FIG. 1A or 1B.

FIGS. 1A and 1B are fragmentary front views of a thin-film magnetic head according to an embodiment of the present invention; FIG. 2 is a fragmentary front view of a thin-film magnetic head according to another embodiment of the present invention; FIG. 3 is a fragmentary front view of a thin-film magnetic head according to still another embodiment of the present invention; FIG. 4 is a longitudinal sectional view of the thin-film magnetic head shown in FIG. 1A or 1B, taken along line 4—4 in the direction parallel to the Y-Z plane, viewed in the direction designated by the arrows.

While FIG. 4 shows a MR/inductive composite thin-film magnetic head (hereinafter referred to as the thin-film magnetic head simply) including a floating MR head h1 provided on a trailing end surface 21a of a ceramic slider 21 and a writing inductive head h2 lying over the MR head h1, FIG. 1 omits the MR head h1.

As shown in FIG. 4, the trailing end surface 21a of the slider 21 is provided thereon with an $Al_2O_3$ layer 22, a lower shield layer 23 formed of a magnetic material, such as NiFe, and a insulative lower gap layer 24, in that order.

On the lower gap layer 24, a magnetoresistive element 25, such as an anisotropic magnetoresistive (AMR) element, a giant magnetoresistive (GMR) element, or a tunnel magnetoresistive (TMR) element, lies in the height direction (Y direction in the figure) from the recording medium-opposing face. The magnetoresistive element 25 and the lower gap layer 24 are covered with an insulative upper gap layer 26. The upper gap layer 26 is provided thereon with an upper shield layer 27 formed of a magnetic material, such as NiFe. The MR head h1 is defined by the composite from the lower shield layer 23 to the upper shield layer 27.

A lower core layer 1 of the inductive head h2 overlies the upper shield layer 27 with a separation layer 28 of $Al_2O_3$ or the like therebetween. The lower core layer 1 is formed of NiFe or the like. A Gd-defining layer 31 is provided on the lower core layer 1. The Gd-defining layer 31 is formed of, for example, insulating material.

A magnetic pole 7 is provided from the recording medium-opposing face to the top of the Gd-defining layer 31. The magnetic pole 7 has a width in the track width direction smaller than that of the lower core layer 1.

The magnetic pole 7 includes a lower magnetic pole layer 2, a nonmagnetic gap layer 3, and an upper magnetic pole layer 5 which are deposited in that order from below.

The lower magnetic pole layer 2 is formed by, for example, directly plating the lower core layer 1. The gap layer 3 overlying the lower magnetic pole layer 2 is formed of a nonmagnetic metal capable of plating. Thus, the lower magnetic pole layer 2, the gap layer 3, and the upper magnetic pole layer 5 can be formed by continuous plating.

The upper magnetic pole layer 5 overlying the gap layer 3 is magnetically coupled with an upper core layer 6 provided on the upper magnetic pole layer 5.

The length in the height direction of the interface between the upper magnetic pole layer 5 and the gap layer 3 defines the gap depth (Gd), as shown in FIG. 4.

The magnetic pole 7 is provided with an insulating layer 37 (lower sublayer 37a and upper sublayer 37b) of an inorganic material, such as $Al_2O_3$ or $SiO_2$ on each of the sides in the track width direction (X direction in the figure) and the height direction (Y direction). The top surface of the insulating layer 37 is flush with the top surface of the magnetic pole 7.

Coil layers 38 are provided by patterning on and in the insulating upper sublayer 37b, as shown in FIG. 4. The coil layer 38 on the insulating upper sublayer 37b is covered with an organic insulating layer 39.

The upper core layer 6 is patterned over the insulating layer 39 from the top surface of the magnetic pole 7 by, for example, frame plating.

A base 6b of the upper core layer 6 is in direct contact with the top surface of a connection layer (back gap layer) 40 formed of a magnetic material, such as NiFe, on the lower core layer 1.

Turning to FIGS. 1A and 1B, the characteristic portion of the thin-film magnetic head will now be described.

As shown in FIGS. 1A and 1B, the upper magnetic pole layer 5 has an bottom surface 5a with a width Tw1 in the track width direction (X direction), and the lower magnetic pole layer 2 has a top surface 2a with a width Tw2 in the track width direction. The width Tw1 of the bottom surface 5a of the upper magnetic pole layer 5 is larger than the width Tw2 of the top surface 2a of the lower magnetic pole layer 2, as shown in FIGS. 1A and 1B.

The width in the track width direction of the gap layer 3 between the upper magnetic pole layer 5 and the lower magnetic pole layer 2 increases gradually from the side edges 2a1 in the track width direction of the top surface 2a of the lower magnetic pole layer 2 to the side edges 5a1 in the track width direction of the bottom surface 5a of the upper magnetic pole layer 5.

The side surfaces 3a of the gap layer 3 slant and connect the side edges 5a1 and 2a1 of the upper magnetic pole layer 5 and the lower magnetic pole layer 2. The side surfaces 3a may be bent, instead of being slanted.

In the present embodiment shown in FIGS. 1A and 1B, each side surface 5b of the upper magnetic pole layer 5 is flush with the corresponding side surface 3a of the gap layer 3 to define a continuous surface.

The gap layer 3 is formed such that its back end 3b in the height direction meets the surface of the Gd-defining layer 31 to prevent the gap layer 3 from extending in the height direction beyond the Gd-defining layer 31, as shown in FIG. 4. Thus, the area of the section of the gap layer 3 taken in the layer-surface direction (X-Y plane direction) is within the area of the bottom surface 5a of the upper magnetic pole layer 5.

Since the width Tw1 of the bottom surface 5a of the upper magnetic pole layer 5 is larger than the width Tw2 of the top surface 2a of the lower magnetic pole layer 2, as described above, side fringing is prevented effectively.

The principle of preventing side fringing and the numerical restriction for preventing the side fringing effectively will be described below.

FIG. 5 is a schematic illustration showing the relationship between the skew angle θ1 and a recording region (track) of a recording medium over which the thin-film magnetic head moves to record, in a magnetic device, such as a hard disk device. In FIG. 5, the upper magnetic pole layer 5 and the lower magnetic pole layer 2 are shown by simplified rectangular shapes. The moving direction of the thin-film magnetic head over a recording medium is designated by a straight line in the description below. However, since the medium is a disk, the moving direction is not linear in practice. In a strict sense, the thin-film magnetic head moves in the direction of the normal to the medium circumference. For ease of description, however, the moving direction is designated by a straight line.

Figure 5A:
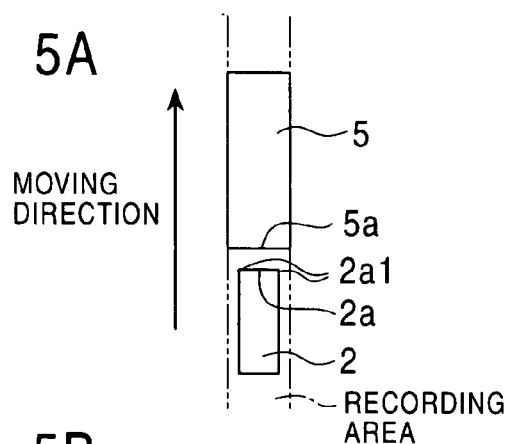
FIGS. 5A to 5C are schematic illustrations showing the relationship between the skew angle θ and the recording region (track) of a recording medium over which a thin-film magnetic head of the present invention moves to write, in a magnetic device.

FIG. 5A shows the case where the skew angle is 0°. Since the top surface 2a of the lower magnetic pole layer 2 has a smaller width than that of the bottom surface 5a of the upper magnetic pole layer 5, as described above, the edge 2a1 of the top surface 2a of the lower magnetic pole layer 2 does not run off the recording region (track) on the recording medium which has been written or will be written with a recording magnetic field generated between the upper magnetic pole layer 5 and the lower magnetic pole layer 2. Thus, the thin-film magnetic head of the present invention does not cause side fringing at a skew angle of 0°. However, if the magnetic head has a skew angle, it is necessary to consider how side fringing depends on the skew angle.

Figure 5B:
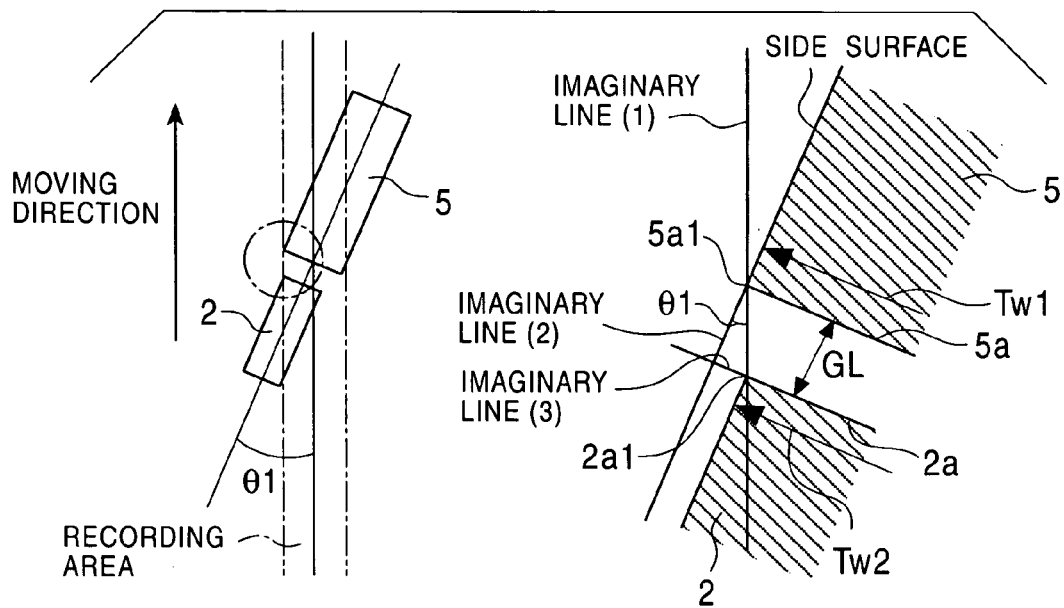
Figure 5C:
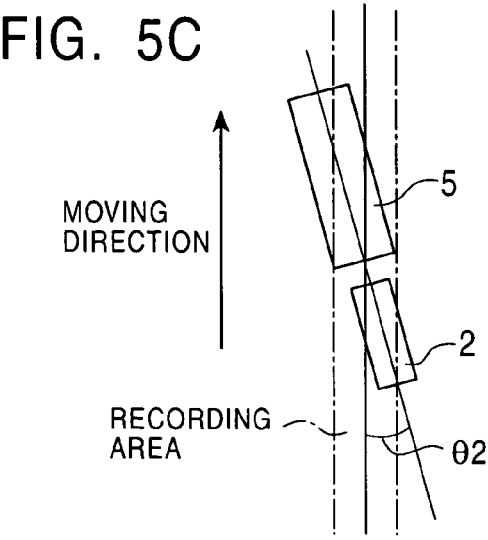

FIG. 5B shows the case where the magnetic head has a skew angle θ1, and shows the limit where side fringing does not occur. The skew angle θ1 is designated as below. The right part of FIG. 5B is a fragmentary enlarged view of the circled portion of the left part.

FIG. 5B shows that the moving direction of the thin-film magnetic head is parallel to imaginary line (1) connecting the edge 2a1 of the top surface 2a of the lower magnetic pole layer 2 with the edge 5a1 of the bottom surface 5a of the upper magnetic pole layer 5.

At this time, imaginary line (2) is drawn from the edge 5a1 of the upper magnetic pole layer 5 in the thickness direction (Z direction shown in FIGS. 1A and 1B), and an extension of the top surface 2a of the lower magnetic pole layer 2 is drawn as imaginary line (3) so as to intersect imaginary line (2) at right angle.

In the triangle defined by imaginary lines (1), (2), and (3), the angle between imaginary lines (1) and (2) corresponds with the skew angle θ1. The length of imaginary line (2) between the intersections with imaginary lines (1) and (3) is the same as the thickness GL of the gap layer 3. The length of imaginary line (3) between the intersection with imaginary line (2) and the edge 2a1 of the top surface 2a of the lower magnetic pole layer 2 is the same as a value obtained by subtracting the width Tw2 of the top surface 2a of the lower magnetic pole layer 2 from the width Tw1 of the bottom surface 5a of the upper magnetic pole layer 5 and dividing the resulting difference by 2, that is, (Tw1−Tw2)/2.

Hence, the relationship $\tan \theta_1 = [(Tw_1-Tw_2)/2]/GL$ holds in the state shown in FIG. 5B.

As described above, FIG. 5B shows the limit where the edge of the lower magnetic pole layer 2 does not cause side fringing. If the skew angle θ1 becomes larger than the value in this state, the edge 2a1 of the top surface 2a of the lower magnetic pole layer 2 runs off the recording region, and thus, side fringing occurs.

In the present invention, therefore, the widths and the thickness are set so as to satisfy the relationship $\tan \theta_1 \leq [(Tw_1-Tw_2)/2]/GL$. Thus, side fringing is prevented effectively.

In FIG. 5B, the upper magnetic pole layer 5 has a skew angle θ1 tilting to the right with respect to the moving direction of the thin-film magnetic head. Although, in FIG. 5C, the upper magnetic pole layer 5 has a skew angle θ2 tilting to the left with respect to the moving direction, the widths and the thickness can be set so as to satisfy the relationship $\tan \theta_2 \leq [(Tw_1-Tw_2)/2]/GL$ to prevent side fringing effectively.

In FIG. 1A, both side surfaces of the upper magnetic pole layer 5 are defined by lower side surfaces 5b slanting such that the width in the track width direction (X direction) of the upper magnetic pole layer 5 gradually increases upward and upper side surfaces 5c extending substantially parallel to each other from the upper edges 5b1 of the lower side surfaces 5b.

According to experiments described later, as shown in FIG. 1B, the upper magnetic pole layer is likely to have side surfaces 5b slanting such that the width in the track width direction (X direction) of the upper magnetic pole layer 5 gradually increases upward and extending from the bottom surface 5a to the bottom surface of the upper core layer 6.

The top surface 5d of the upper magnetic pole layer 5 has a width Tw3 in the track width direction. This width Tw3 is larger than the width Tw1 of the bottom surface 5a of the upper magnetic pole layer 5, consequently, ensuring a large volume of the upper magnetic pole layer 5. Thus, the recording characteristics, such as overwrite (OW) characteristics, can be enhanced.

On the other hand, both side surfaces 2b of the lower magnetic pole layer 2 slant such that the width in the track width direction (X direction) of the lower magnetic pole layer 2 gradually increases downward.

The bottom surface 2c of the lower magnetic pole layer 2 has a width Tw4 in the track width direction. This width Tw4 is larger than the width Tw2 of the top surface 2a of the lower magnetic pole layer 2, consequently, ensuring a large volume of the lower magnetic pole layer 2. Thus, the recording characteristics, such as overwrite (OW) characteristics, can be enhanced.

In order to enhance the OW characteristics effectively, it is preferable to ensure a large volume of the upper magnetic pole layer 5 as much as possible. Accordingly, Tw3 is preferably set larger than Tw4 so that the volume of the upper magnetic pole layer 5 becomes larger than that of the lower magnetic pole layer 2.

The present invention is intended to give an appropriate shape to the magnetic pole 7 including the lower magnetic pole layer 2, the gap layer 3, and the upper magnetic pole layer 5. The magnetic pole 7 is provided separate from portions defining a magnetic circuit unit, such as the lower core layer 1 and the upper core layer 6. The region right behind the magnetic pole 7 can be used as a coil-forming region 38a in which the coil layer 38 is provided, as shown in FIG. 4.

The number of turns and cross section of each coil in the coil layer 38 are specified in advance to ensure inductance and other properties required. Accordingly, it is preferable that a wide area be ensured for the coli layer-forming region. However, particularly the miniaturization of the thin-film magnetic head makes it difficult to ensure a wide area for the coil layer-forming region 38a. By providing the magnet pole 7 between the lower core layer 1 and the upper core layer 6 on the medium-opposing face side, the coil layer-forming region 38a can be ensured relatively wide. Also, by providing the magnetic pole 7 in appropriate shape, side fringing is prevented and the OW characteristics are ensured. In addition, the track width of the magnetic pole 7 can be reduced, and thus high recording density can be achieved.

The lower magnetic pole layer 2, the gap layer 3, and the upper magnetic pole layer 5 can be formed by plating, as described above. Consequently, the lower magnetic pole layer 2, the gap layer 3, and the upper magnetic pole layer 5 can be easily formed in appropriate shapes as shown in FIG. 1A or 1B, as described later in the description of the method. However, in order to set the width Tw1 of the bottom surface 5a of the upper magnetic pole layer 5 to be larger than the width Tw2 of the top surface 2a of the lower magnetic pole layer 2, what the gap layer 3 is formed of is important.

The gap layer 3 is formed of NiPRe or Au in the present invention. Such materials are nonmagnetic metal. By using a nonmagnetic metal as the gap layer 3, the recording magnetic field can be enhanced advantageously.

More specifically, an eddy current occurs in the nonmagnetic gap layer 3. The eddy current generates a magnetic field to increase a leakage flux in the gap layer 3, consequently enhancing the recording magnetic field.

In addition to enhancing the recording magnetic field, the form of the invention can appropriately prevent side fringing resulting from the leakage flux from the gap layer 3.

If the side surfaces 3a of the gap layer 3 protrude in the track width direction from the side edges 5a1 and 2a1 of the upper magnetic pole layer 5 and the lower magnetic pole layer 2, the leakage flux is generated from the gap layer 3 over an area wider than the track width Tw, consequently causing side fringing easily.

In contrast, in the present invention, the gap layer 3 is provided in a very small area bounded by the side edges 5a1 and 2a1 of the upper magnetic pole layer 5 and the lower magnetic pole layer 2. Thus, the leakage flux from the gap layer 3 does not easily spread beyond the track width Tw, and consequently side fringing resulting from the leakage flux can be prevented effectively.

The forms of the magnetic pole 7 shown in FIGS. 1A and 1B are nothing more than examples. As shown in FIG. 2, the side surfaces 5e in the track width direction (X direction) of the upper magnetic pole layer 5 may substantially vertically extend when viewed from the bottom surface of the lower core layer 1, or the side surfaces 2d in the track width direction of the lower magnetic pole layer 2 may substantially vertically extend when viewed from the bottom surface of the lower core layer 1. In this case, the width Tw1 in the track width direction of the bottom surface 5a of the upper magnetic pole layer 5 is set larger than the width Tw2 of the top surface 2a of the lower magnetic pole layer 2, and the side surfaces 3a of the gap layer 3 between the upper magnetic pole layer 5 and the lower magnetic pole layer 2 slant to the edges 5a1 of the bottom surface 5a of the upper magnetic pole layer 5 from the edges 2a1 of the top surface 2a of the lower magnetic pole layer 2.

In FIG. 3, which shows another form, the upper magnetic pole layer 5 has the same shape as that shown in FIG. 2, but the lower magnetic pole layer 2 is defined by upper side surfaces 2e slanting such that the width in the track width direction of the lower magnetic pole layer 2 gradually increases downward and lower side surfaces 2f extending substantially parallel to each other in the direction of the height of the magnetic pole 7 (Z direction) from the lower edges 2e1 of the lower side surfaces 2e, like the upper magnetic pole layer 5 shown in FIG. 1A.

The side surfaces 5f of the upper magnetic pole layer 5 may diverge upward and extend to the top surface 5d of the upper magnetic pole layer 5, as designated by dotted-chain lines.

Any one of the shapes shown in FIGS. 1A to 3 may be selected independently for the magnetic pole layers 2 and 5. Also, the magnetic pole 7 may be formed by other combinations of the shapes of the lower magnetic pole layer 2 and the upper magnetic pole layer 5.

A method for manufacturing the thin-film magnetic head of the present invention will now be described with reference to FIGS. 6 to 8. These figures are each an enlarged front view showing a step of the method.

Since the present invention is characterized by the structure of the magnetic pole 7, and other portions are made by a conventional method or process, the description below essentially consists of the steps of a process of magnetic pole formation.

Figure 6:
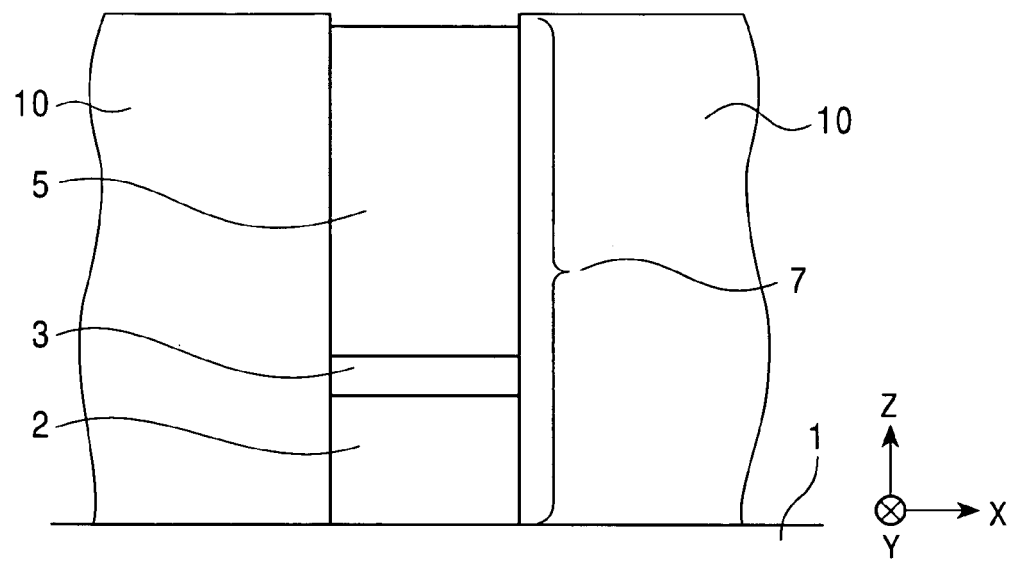
FIG. 6 is a representation of a step of a method for manufacturing a magnetic pole of a thin-film magnetic head of the present invention.

After depositing layers up to the magnetic lower core layer 1 shown in FIG. 4, and further forming the Gd-defining layer 31 of a resist on the lower core layer 1, the step shown in FIG. 6 is performed.

In the step shown in FIG. 6, a resist is applied onto the lower core layer 1 at a predetermined thickness to form a resist layer 10. A hole 10a in which the magnetic pole 7 will be provided is formed in the resist layer 10 by exposure and development. The hole 10a has a predetermined length in the height direction (Y direction) from the recording medium-opposing face, and a predetermined width in the track width direction (X direction).

The top surface of the lower core layer 1 is exposed at the bottom surface of the hole 10a. Alternatively, a plating base layer (not shown in the figure) deposited on the lower core layer 1 by, for example, sputtering may be exposed.

In the step shown in FIG. 6, the lower magnetic pole layer 2, the gap layer 3, and the upper magnetic pole layer 5 are deposited, in that order, in the hole 10a by plating.

The lower magnetic pole layer 2 and the upper magnetic pole layer 5 may be formed of a magnetic material having a saturation flux density higher than that of the lower core layer 1 and the upper core layer 6, by plating. For example, for a lower core layer 1 and an upper core layer 6 formed of a NiFe alloy, the lower magnetic pole layer 2 and the upper magnetic pole layer 5 are formed of a CoFe or CoFeNi alloy.

The gap layer 3 between the lower magnetic pole layer 2 and the upper magnetic pole layer 5 is formed of NiPRe or Au in the present invention. For example, the gap layer 3 is formed by plating with NiPRe.

The material of the gap layer 3 is capable of plating as a matter of course, and besides, the rate in ion milling is an important factor. This will be described in detail later.

After forming the magnetic pole 7 by plating, the resist layer 10 is removed. Only the magnetic pole 7 and the Gd-defining layer 31 are provided through the step shown in FIG. 6.

Figure 7:
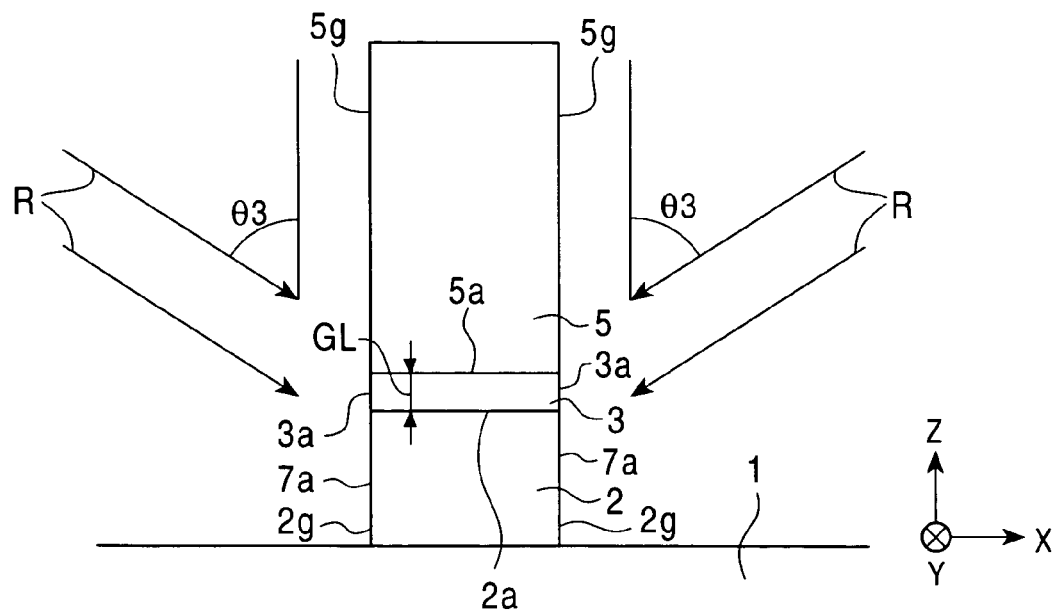
FIG. 7 is a representation of a step following the step shown in FIG. 6.

Turning to the step shown in FIG. 7, the side surfaces 7a of the magnetic pole 7 are cut off by, for example, ion milling. Arrows R shown in FIG. 7 designate the directions of ion radiation, which is defined by an angle θ3 with respect to a direction perpendicular to the top surface of the lower core layer 1 (Z direction).

In this instance, the sides 3a of the gap layer 3 of the magnetic pole 7 are cut off faster than the sides 5g and 2g of the upper magnetic pole layer 5 and lower magnetic pole layer 2, and particularly the lower portions of the sides 3a of the gap layer 3 are more easily cut off due to ion irradiation in the slating direction. Since the lower portions of the sides 3a of the gap layer 3 are cut off faster than the upper portions, the vicinity of the side edges of the top surface 2a of the lower magnetic pole layer 2 is also be cut off easily. Thus, the edges of the top surface 2a of the lower magnetic pole layer 2 are cut off faster than the edges of the bottom surface 5a of the upper magnetic pole layer 5.

Figure 8:
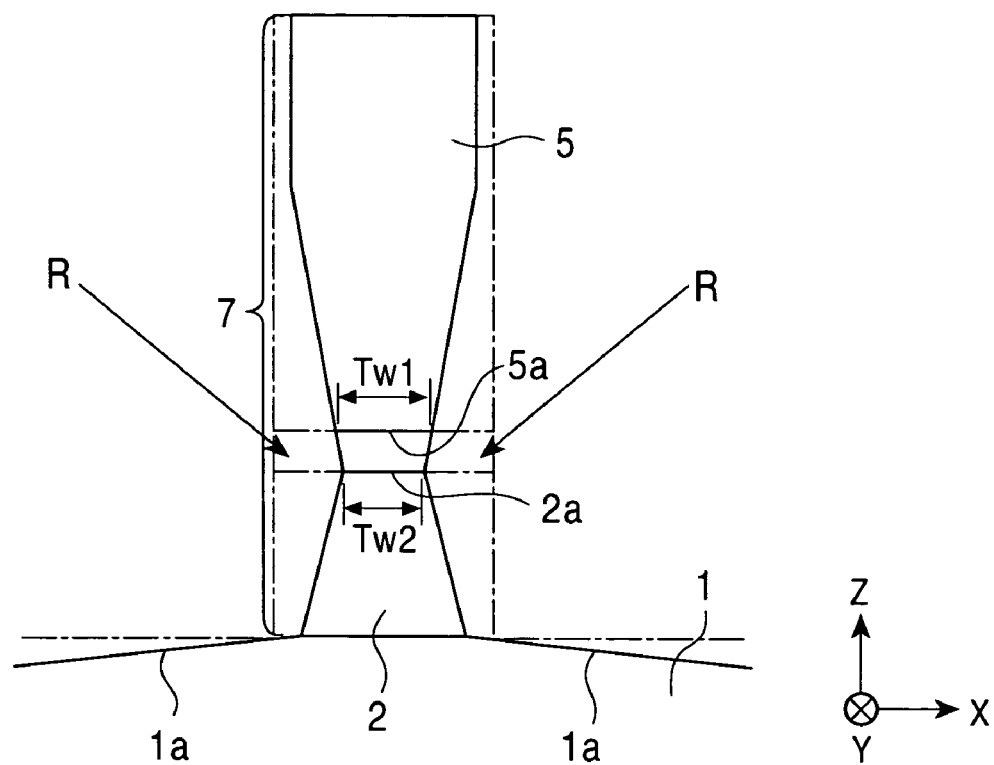
FIG. 8 is a representation of a step following the step shown in FIG. 7.

Consequently, the width Tw1 of the bottom surface 5a of the upper magnetic pole layer 5 is ensured to be larger than the width Tw2 of the top surface 2a of the magnetic pole layer 2, as designated by solid lines shown in FIG. 8.

In order to set the width Tw1 in the track width direction of the bottom surface 5a of the upper magnetic pole layer 5 to be larger than the width Tw2 in the track width direction of the top surface 2a of the lower magnetic pole layer 2, it is important to take into account the following.

First, the material of the gap layer 3 is appropriately selected. As described above, the gap layer 3 is formed of, for example, NiPRe. The material of the gap layer 3 is required to have a milling rate higher than that of the lower magnetic pole layer 2 and the upper magnetic pole layer 5, for the ion irradiation angle θ3 for cutting the sides 3a of the gap layer 3. NiPRe has a higher milling rate than that of NiFe or CoFe alloys which are used as the material of the lower magnetic pole layer 2 and the upper magnetic pole layer 5.

Second, the direction of ion irradiation is appropriately selected. Preferably, the ion irradiation angle θ3 shown in FIG. 7 is in the range of 50° to 70°. More preferably, it is set in the range of 55° to 60°. Milling rates of layers and how the layers are cut off depend on the ion irradiation angle θ3.

If the ion irradiation angle θ3 is outside the above-described range, the sides 3a of the gap layer 3 are cut off at substantially the same proportion from the lower portion to the upper portion. Consequently, the width Tw1 of the bottom surface 5a of the upper magnetic pole layer 5 becomes substantially the same as or smaller than the width Tw2 of the top surface 2a of the lower magnetic pole layer 2. This is why the ion irradiation angle θ3 is specified in the range of 50° to 70°.

Third, the thickness GL of the gap layer 3 is appropriately selected. The thickness GL of the gap layer 3 has to be large to some extent. An excessively small thickness GL makes it difficult to give a difference between the width Tw1 of the bottom surface 5a of the upper magnetic pole layer 5 and the width Tw2 of the top surface 2a of the lower magnetic pole layer 2. In contrast, an excessively large thickness GL does not allow a large skew angle θ1 or θ2. Consequently, even a small skew angle causes side fringing or affects recording characteristics, and thus, for example, reduces the recording magnetic field. Thus the thickness of the gap layer 3 is an important factor.

Preferably, the thickness GL of the gap layer 3 is in the range of 0.06 to 0.18 μm. A thickness GL outside this range makes it difficult to set the width Tw1 of the bottom surface 5a of the upper magnetic pole layer 5 to be larger than the width Tw2 of the top surface 2a of the lower magnetic pole layer 2. Also, recording characteristics are likely to deteriorate.

In FIG. 8, the dotted-chain lines designate the portion of the magnetic pole 7 to be removed by ion milling, and the solid lines designate the portion remaining after ion milling.

In this instance, the lower core layer 1 is also affected by the ion milling and given slops so that the thickness of the lower core layer 1 decreases gradually in directions away from the side edges 7b in the track width direction of the bottom surface of the magnetic pole 7.

By applying the method for manufacturing the thin-film magnetic head of the present invention, the width Tw1 in the track width direction (X direction) of the bottom surface 5a of the upper magnetic pole layer 5 can be set to be larger than the width Tw2 in the track width direction of the top surface 2a of the lower magnetic pole layer 2. Thus, the resulting thin-film magnetic head can appropriately prevent side fringing In particular, by appropriately selecting the material of the gap layer 3, which lies between the upper magnetic pole layer 5 and the lower magnetic pole layer 2, and by appropriately setting the ion irradiation angle θ3 for ion milling, the width Tw1 can be set larger than the width Tw2.

Any one of the shapes of the upper magnetic pole layer 5 and the lower magnetic pole layer 2 shown in FIGS. 1 to 3 can be selected as needed, by selecting the ion irradiation angle θ3, the thickness GL of the gap layer 3, and other parameters. For example, according to experiments described later, a smaller ion irradiation angle tends to make the upper magnetic pole layer 5 and the lower magnetic pole layer 2 a straight form. A larger thickness GL of the gap layer 3 tends to give slopes to the side surfaces of the upper magnetic pole layer 5 or the lower magnetic pole layer 2 as shown in FIGS. 1A, 1B and 3.

The thin-film magnetic head of the present invention is used in, for example, a magnetic head device of a hard disk device. The thin-film magnetic head may be used in a floating magnetic head device or a contact magnetic head device. The thin-film magnetic head can be used for magnetic sensors, in addition to hard disk devices.

EXAMPLES

Solid films (hereinafter referred to as test specimens) are formed of various types of material, and the milling rate of each test specimen was measured.

The test specimen was processed to a pattern with a diameter of about 7 mm on a substrate with a diameter of 4 inches (about 10.2 cm). Ion milling was performed with Ar gas at a beam voltage of 400 V and a beam current of 300 mA.

Figure 9:
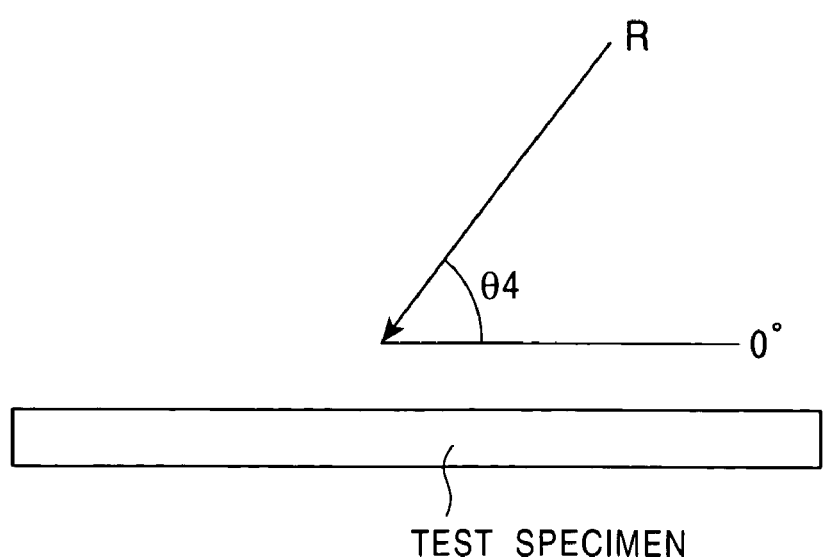
FIG. 9 is a schematic illustration of an experiment for the milling rates of several types of material.

The ion irradiation angle θ4 is defined as the angle formed by the direction R of the ion irradiation and the direction of 0° with respect to the surface of the test specimen, as shown in FIG. 9.

Thus, the irradiation angle θ4 shown in FIG. 9 corresponds to the irradiation angle θ3 shown in FIG. 7. Hence, a preferred ion irradiation angle θ4 determined in FIG. 10 can be used as the ion irradiation angle θ3 in FIG. 7.

Figure 10:
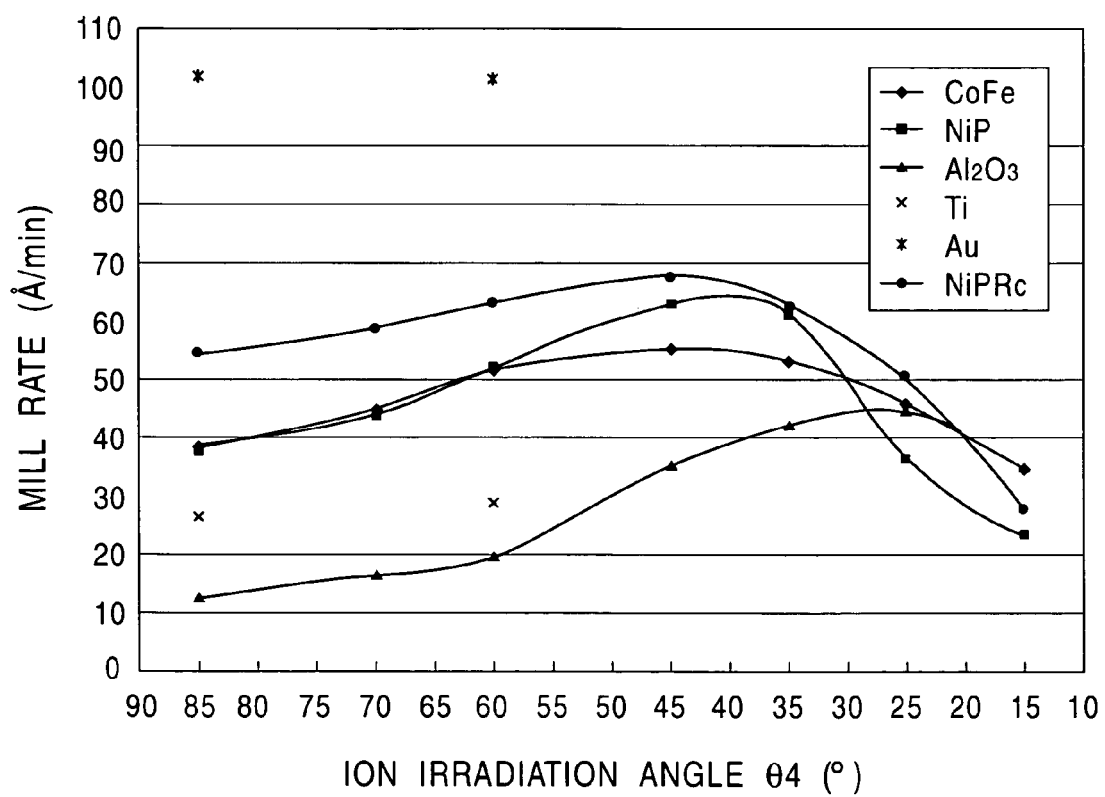
FIG. 10 is a plot showing the relationships between the ion irradiation angle θ4 and the milling rate, for each material.

FIG. 10 shows that the milling rate of each material depends on the ion irradiation angle θ4. For example, the milling rate of $Al_2O_3$, which is often used as the gap layer, is lower (slower) than that of a CoFe alloy. If the cap layer is formed of $Al_2O_3$ and the magnetic portions are formed of the CoFe alloy, the magnetic portions are cut off faster. Thus, the magnetic pole 7 cannot be formed in the shape shown in, for example, FIG. 1A or 1B because.

NiP, shown in FIG. 10, is capable of plating, as well as magnetic materials, such as the CoFe alloy, and can be used as the gap layer of the magnetic pole having the shape shown in, for example FIG. 1A or 1B. However, the milling rate of NiP is lower than or substantially equal to that of the CoFe alloy, for an ion irradiation angle θ4 of 60° or more. Although an ion irradiation angle θ4 of about 50° or lower allows the milling rate of NiP to be higher than that of the CoFe alloy, the gap layer formed of NiP cannot provide a width of the bottom surface of the upper magnetic pole layer larger than the width of the top surface of the lower magnetic pole layer, and thus cannot achieve the magnetic pole having the shape as shown in, for example, FIG. 1A or 1B. Since the milling rates of NiFe and NiFeCo alloys are substantially the same as the milling rate of the CoFe alloy, the same goes for the relationship in milling rate between NiFe or NiFeCo alloy and NiP.

FIG. 10 shows that NiPRe (Ni: 71 percent by weight, P: 13 percent by weight, Re: 16 percent by weight) has a higher milling rate than NiP. The NiPRe is a nonmagnetic material capable of plating, as well as NiP, and besides has a higher milling rate than CoFe and NiP. Accordingly, it was decided to use the NiPRe as one of the materials of the gap layer, in the present invention.

For an example, a magnetic pole including a NiPRe gap layer was prepared, and subjected to ion milling under predetermined conditions. The shape of the resulting magnetic pole was examined. For a comparative example, a magnetic pole including a NiP gap layer was prepared, and subjected to ion milling under the same conditions. The shape of the resulting magnetic pole was examined as well.

Figure 11A:
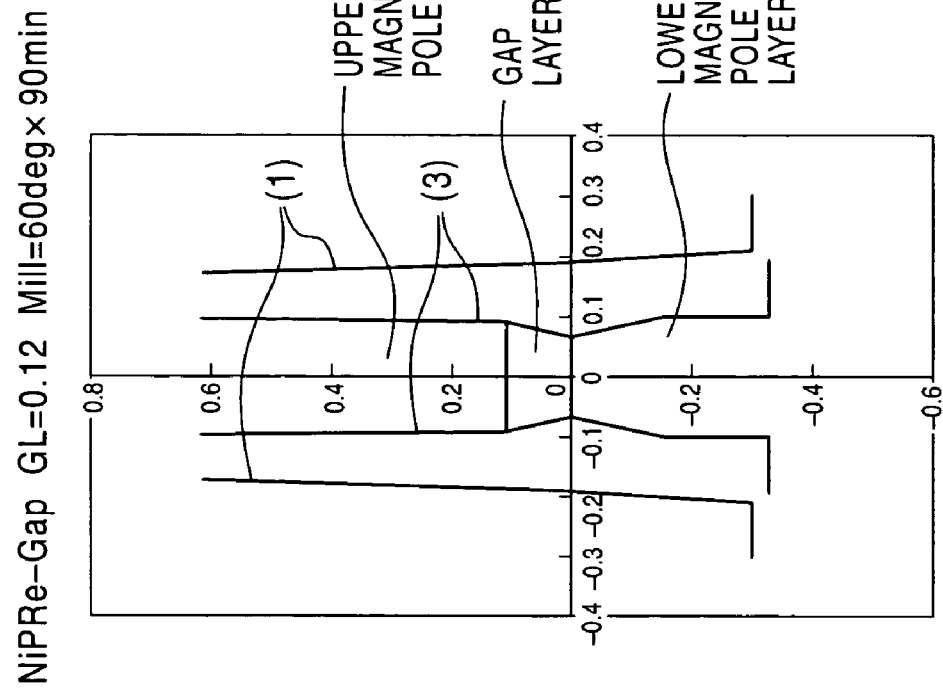
FIG. 11A shows a silhouette of a magnetic pole whose gap layer is formed of NiP.
Figure 11B:
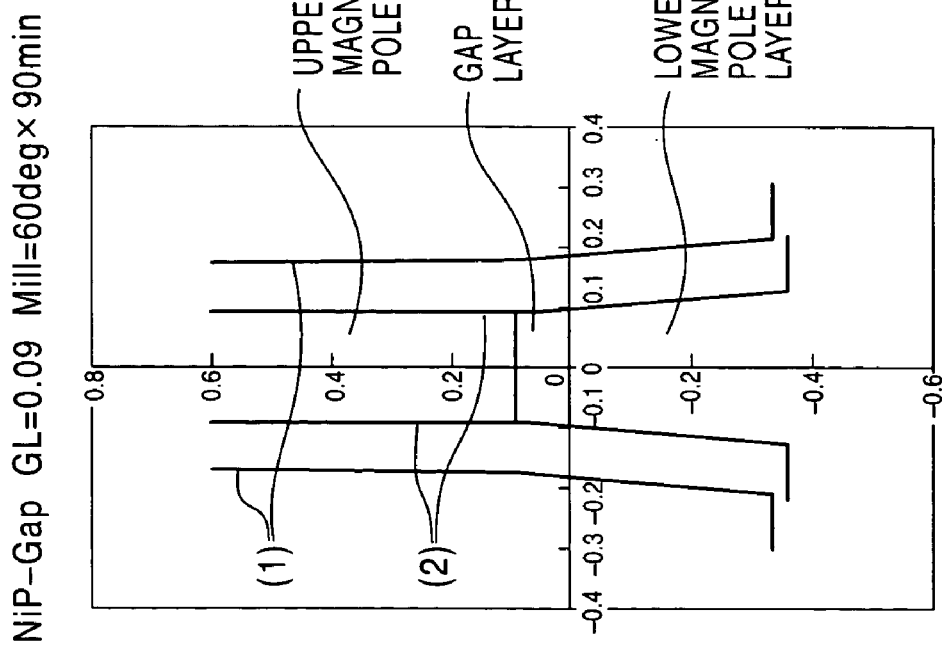
FIG. 11B shows a silhouette of a magnetic pole whose gap layer is formed of NiPRe.

The results are shown in FIGS. 11A and 11B. FIG. 11A shows the shape of the comparative example using NiP as the gap layer; FIG. 11B shows the shape of the example using the NiPRe (Ni: 71 percent by weight, P: 13 percent by weight, Re: 16 percent by weight) as the gap layer. The thickness of the NiP layer was set at 0.09 μm in the comparative example; the thickness of the NiPRe layer was set at 0.12 μm in the example. The track width Tw, which is defined as the width of the bottom surface of the upper magnetic pole layer in this instance, was set at 0.35 μm before milling, in both the example and the comparative example. Also, in both the example and the comparative example, the lower magnetic pole layer and the upper magnetic pole layer were formed of a CoFe alloy.

Ion milling was performed at an ion irradiation angle θ4 of 60° for 90 minutes in both the example and the comparative example.

In FIGS. 11A and 11B, lines (1) designate the silhouette of the magnetic pole before ion milling. The magnetic pole in this state was cut off by ion milling under the above-described conditions. Lines (2) in FIG. 11A designate the silhouette of the magnetic pole of the comparative example after the completion of the milling. Lines (3) in FIG. 11B designate the silhouette of the magnetic pole of the example after the completion of the milling as well.

As a result, it was found that, in the comparative example, the width of the bottom surface of the upper magnetic pole layer was smaller than the width of the top surface of the lower magnetic pole layer.

In contrast, in the example shown in FIG. 11B, the width of the bottom surface of the upper magnetic pole layer was larger than the width of the top surface of the lower magnetic pole layer.

Thus, the comparative example using NiP for the gap layer did not allow the bottom surface of the upper magnetic pole layer to have a width larger than that of the top surface of the lower magnetic pole layer.

In the experiment shown in FIGS. 11A and 11B, the ion irradiation angle θ4 was set at 60°. FIG. 10 shows that the milling rates of NiP and CoFe are substantially the same for an ion irradiation angle θ4 of 60°. On the other hand, the NiPRe has a higher milling rate than the CoFe alloy has.

FIGS. 12A to 14C show that how the shape of the magnetic pole including the gap layer of the NiPRe (Ni: 71 percent by weight, p: 13 percent by weight, Re: 16 percent by weight) is changed depending on the ion irradiation angle θ4 and the thickness GL of the gap layer.

Figures 12A, 12B, 12C:
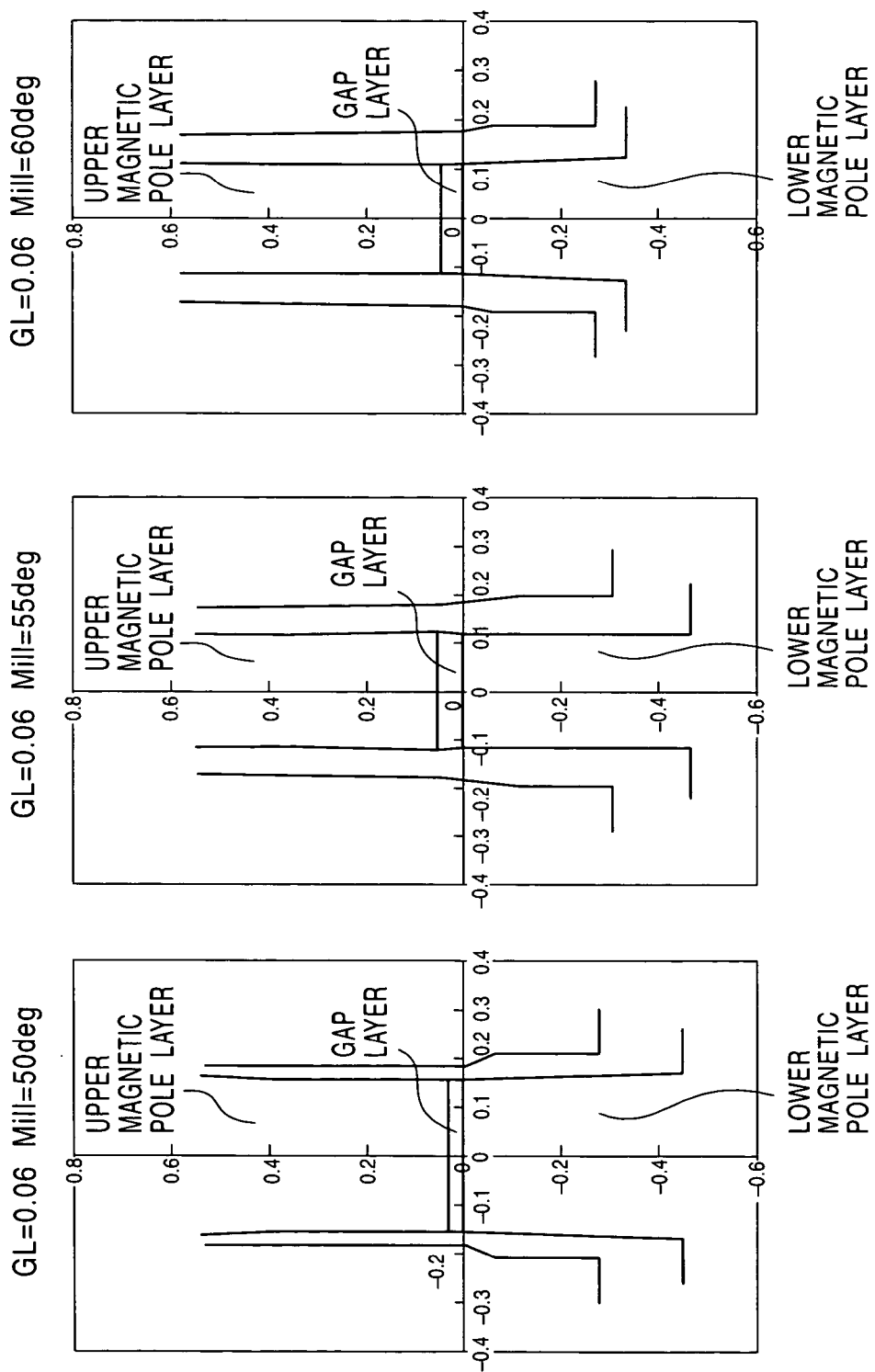
FIGS. 12A to 12C show silhouettes of magnetic popes whose gap layer has a fixed thickness GL of 0.06 μm when milling is performed at respective ion irradiation angles θ4: 50° for FIG. 12A; 55° for FIG. 12B; and 60° for FIG. 12C.

In FIGS. 12A to 12C, the thickness GL of the gap layer was fixed at 0.06 μm. The milling time was 90 minutes, as in FIGS. 11A and 11B. The upper magnetic pole layer and the lower magnetic pole layer were formed of a CoFe alloy.

FIG. 12A is for an ion irradiation angle θ4 of 50°; FIG. 12B, 55°; FIG. 12C, 60°. In each figure, the outer lines designate the silhouette of the magnetic pole before milling; the inner lines, after milling.

FIG. 12A shows that the width of the bottom surface of the upper magnetic pole layer is smaller than that of the top surface of the lower magnetic pole layer. In contrast, FIGS. 12B and 12C show that the width of the bottom surface of the upper magnetic pole layer is larger than that of the top surface of the lower magnetic pole layer.

Figure 13A:
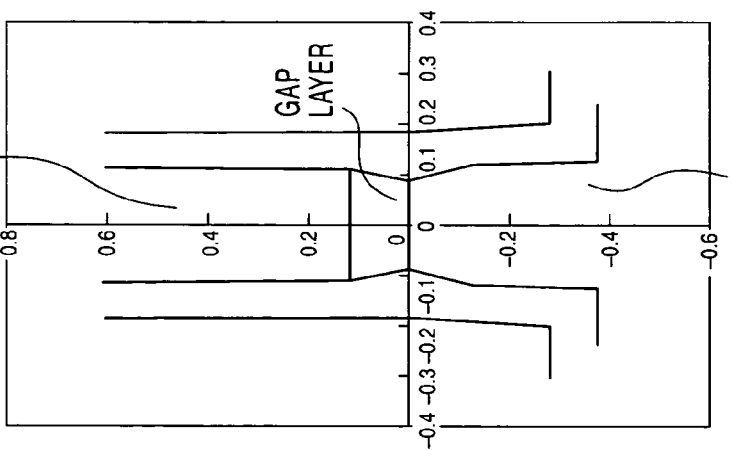
FIGS. 13A to 13C show silhouettes of magnetic popes whose gap layer has a fixed thickness GL of 0.12 μm when milling is performed at respective ion irradiation angles θ4: 50° for FIG. 13A; 55° for FIG. 13B; and 60° for FIG. 13C.
Figure 13B:
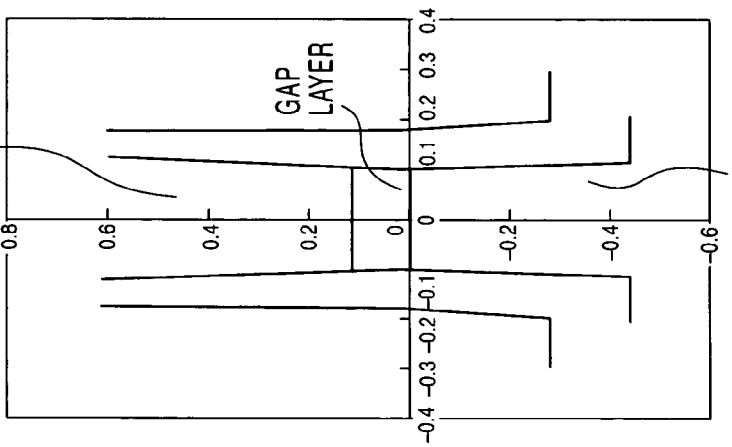
Figure 13C:
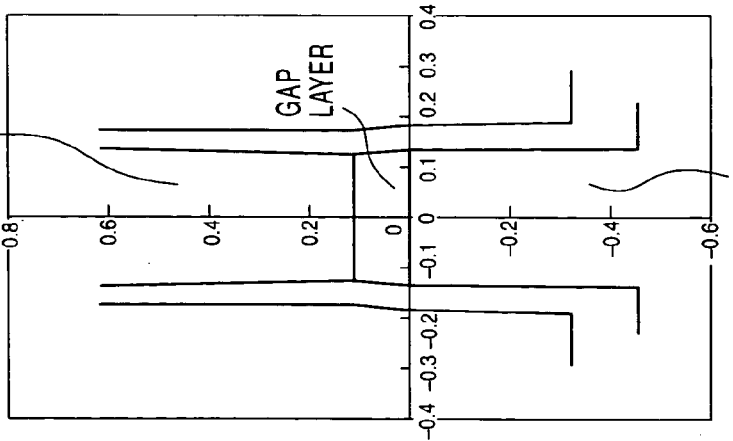

In FIGS. 13A to 13C, the thickness GL of the gap layer was fixed at 0.12 μm. The milling time was 90 minutes, as in FIGS. 11A and 11B. The upper magnetic pole layer and the lower magnetic pole layer were formed of a CoFe alloy.

FIG. 13A is for an ion irradiation angle θ4 of 50°; FIG. 13B, 55°; FIG. 13C, 60°. In each figure, the outer lines designate the silhouette of the magnetic pole before milling; the inner lines, after milling.

FIG. 13A shows that the width of the bottom surface of the upper magnetic pole layer is smaller than that of the top surface of the lower magnetic pole layer. In contrast, FIGS. 13B and 13C show that the width of the bottom surface of the upper magnetic pole layer is larger than that of the top surface of the lower magnetic pole layer.

Figure 14A:
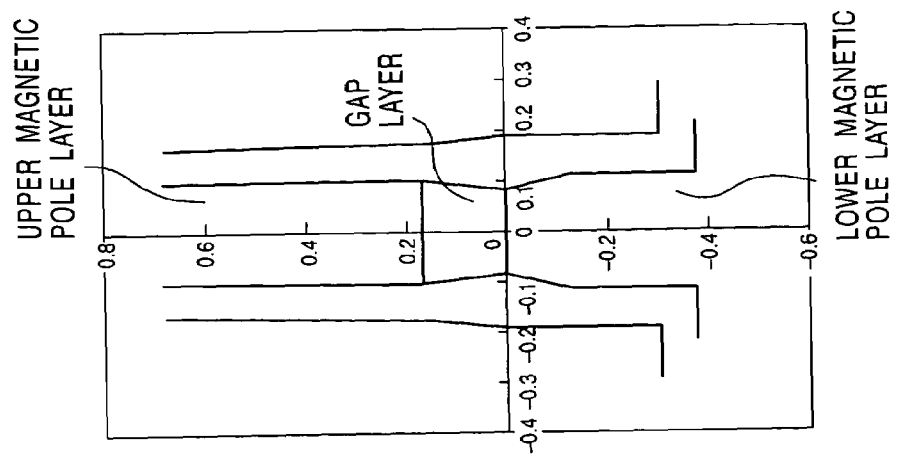
FIGS. 14A to 14C show silhouettes of magnetic popes whose gap layer has a fixed thickness GL of 0.18 μm when milling is performed at respective ion irradiation angles θ4: 50° for FIG. 14A; 55° for FIG. 14B; and 60° for FIG. 14C.
Figure 14B:
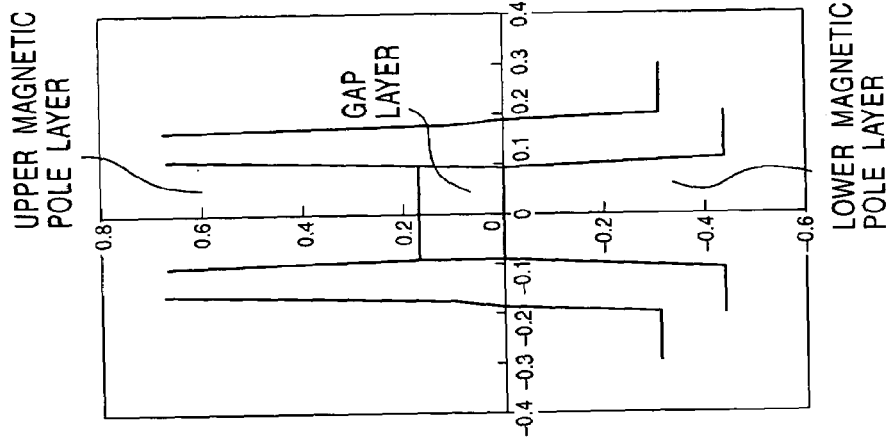
Figure 14C:
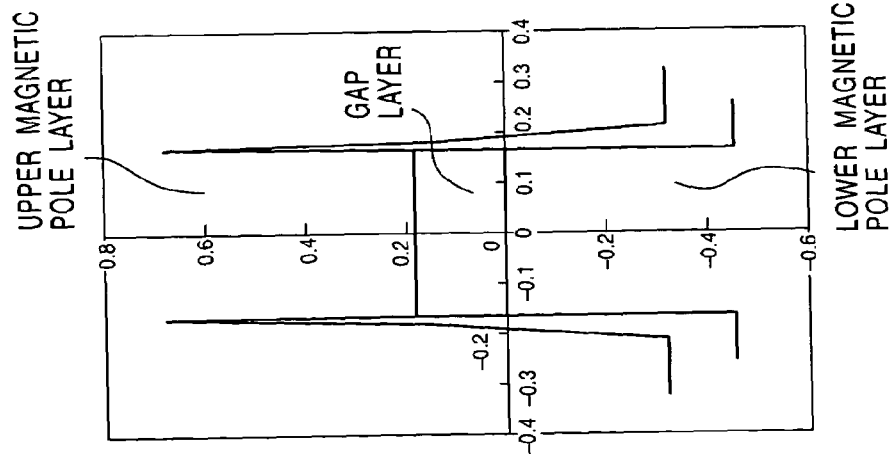
Figure 15:
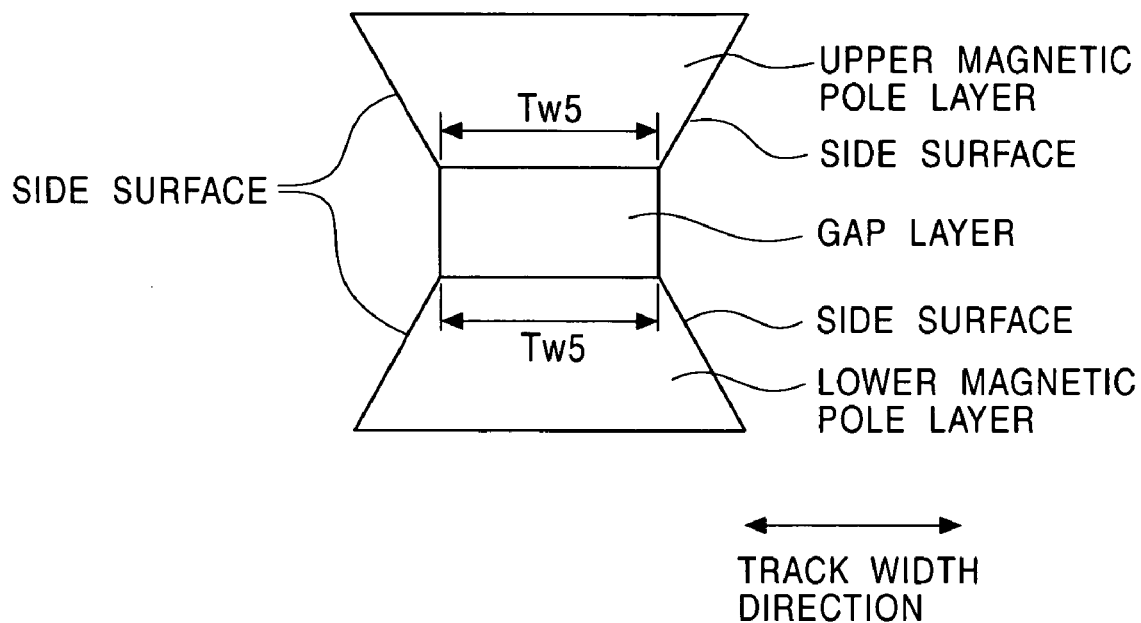
FIG. 15 is a fragmentary front view of a magnetic pole of a known thin-film magnetic head.
Figure 16:
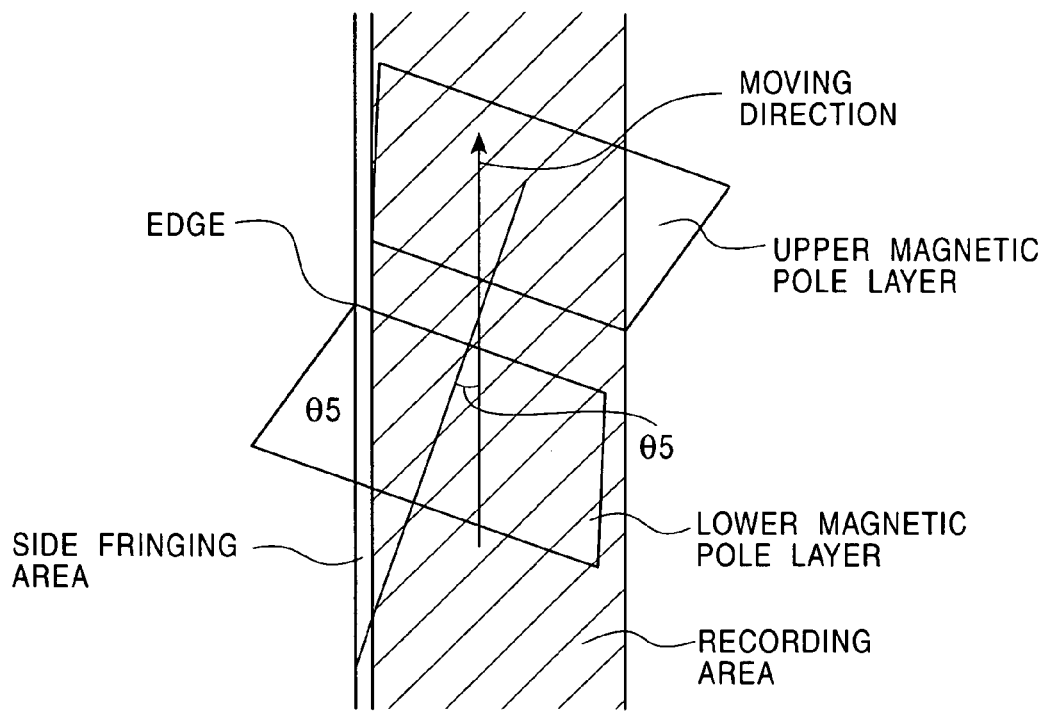
FIG. 16 is a schematic illustration showing a problem in the shape of the magnetic pled shown in FIG. 15.
Figure 17:
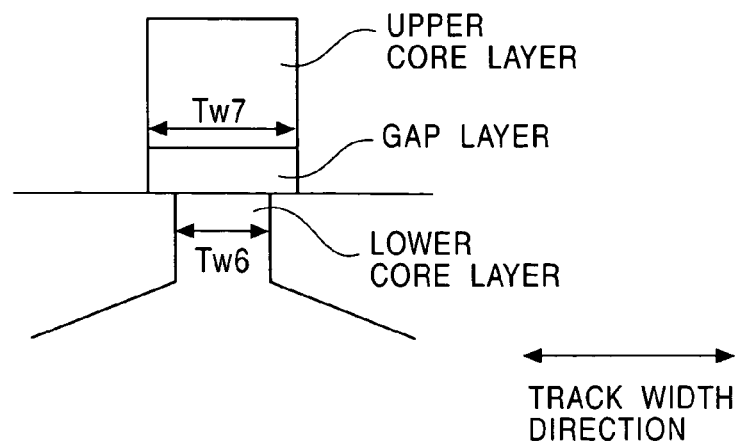
FIG. 17 is a fragmentary front view of another known thin-film magnetic head.

In FIGS. 14A to 14C, the thickness GL of the gap layer was fixed at 0.18 μm. The milling time was 90 minutes, as in FIGS. 11A and 11B. The upper magnetic pole layer and the lower magnetic pole layer were formed of a CoFe alloy.

FIG. 14A is for an ion irradiation angle θ4 of 50°; FIG. 14B, 55°; FIG. 12C, 60°. In each figure, the outer lines designate the silhouette of the magnetic pole before milling; the inner lines, after milling.

FIGS. 14A, 14B, and 14C each show that the width of the bottom surface of the upper magnetic pole layer is larger than that of the top surface of the lower magnetic pole layer.

The results shown in FIGS. 12A to 14C suggest that a larger gap layer thickness GL, specifically a thickness as large as about 0.18 μm, leads to a shape in which the width of the bottom surface of the upper magnetic pole layer is larger than that of the top surface of the lower magnetic pole layer even if the ion irradiation angle θ4 is 50°.

Also, it has been found that an ion irradiation angle θ4 of 55° or 60° leads to a shape in which the width of the bottom surface of the upper magnetic pole layer is larger than that of the top surface of the lower magnetic pole layer even if the gap layer thickness GL is as small as about 0.06 μm.

According to the results above, the following is specified in the present invention. The gap layer is formed of the NiPRe. The ion irradiation angle θ4 is in the range of 50° to 70°. More preferably, the angle θ4 is in the range of 55° to 60°. The thickness of the gap layer is in the range of 0.06 to 0.18 μm.

In the present invention, Au may also be used as the gap layer, according to the results shown in FIG. 10.

What is claimed is:

1. A thin-film magnetic head, comprising:
   a magnetic pole disposed in a predetermined region lying in a height direction from a face opposing a recording medium, the magnetic pole including a lower magnetic pole layer, an upper magnetic pole layer, and a gap layer lying between the lower magnetic pole layer and the upper magnetic pole layer;
   a magnetic circuit unit for conducting a recording magnetic field to the magnetic pole; and
   a coil layer for inducing the recording magnetic field, disposed at a back in the height direction of the magnetic pole,
   wherein a width Tw1 in a track width direction of a bottom surface of the upper magnetic pole layer is larger than a width Tw2 in the track width direction of a top surface of the lower magnetic pole layer, and a width in the track width direction of the gap layer gradually increases from the side edges in the track width direction of the top surface of the lower magnetic pole layer to side edges in the track width direction of the bottom surface of the upper magnetic pole layer.

2. The thin-film magnetic head according to claim 1, wherein a width Tw3 in the track width direction of a top surface of the upper magnetic pole layer is larger than the width Tw1 of the bottom surface of the upper magnetic pole layer.

3. The thin-film magnetic head according to claim 1, wherein a width Tw4 in the track width direction of a bottom surface of the lower magnetic pole layer is larger than the width Tw2 of the top surface of the lower magnetic pole layer.

4. The thin-film magnetic head according to claim 1, wherein a width Tw3 in the track width direction of a top surface of the upper magnetic pole layer is larger than a width Tw4 in the track width direction of a bottom surface of the lower magnetic pole layer.

5. The thin-film magnetic head according to claim 1, wherein the gap layer comprises NiPRe or Au.

6. A magnetic device, comprising:
   a recording medium; and
   a thin-film magnetic head comprising a magnetic pole disposed in a predetermined region lying in a height direction from a face opposing the recording medium, a magnetic circuit unit for conducting a recording magnetic field to the magnetic pole, and a coil layer for inducing the recording magnetic field, disposed at a back in the height direction of the magnetic pole, the magnetic pole including a lower magnetic pole layer, an upper magnetic pole layer, and a gap layer lying between the lower magnetic pole layer and the upper magnetic pole layer, wherein a width Tw1 in a track width direction of a bottom surface of the upper magnetic pole layer is larger than a width Tw2 in the track width direction of a top surface of the lower magnetic pole layer, and a width in the track width direction of the gap layer gradually increases from side edges in the track width direction of the top surface of the lower magnetic pole layer to side edges in the track width direction of the bottom surface of the upper magnetic pole layer,
   wherein the thin-film magnetic head moves over the recording medium at a skew angle $\theta$ satisfying the relationship $\tan\theta \leq [(Tw1-Tw2)/2]/(\text{gap layer thickness } GL)$.

* * * * *